United States Patent [19]

Kuhar, Jr.

[11] 3,796,834

[45] Mar. 12, 1974

[54] TECHNIQUE AND APPARATUS FOR TESTING A TIME DIVISION MULTIPLEXED TRANSMISSION SYSTEM USING SELECTIVE SIGNAL BIT EXTRACTION

[75] Inventor: John Kuhar, Jr., Middletown, N.J.

[73] Assignee: Bell Telephone Laboratories, Incorporated, Murray Hill, N.J.

[22] Filed: Dec. 15, 1972

[21] Appl. No.: 315,549

[52] U.S. Cl. ............ 179/15 BF, 179/15 A, 328/110

[51] Int. Cl. ............ H04j 3/14

[58] Field of Search ............ 178/69.5 R; 179/15 BS, 179/15 A, 15 BF; 328/110

[56] References Cited

UNITED STATES PATENTS

| | | | |
|---|---|---|---|
| 3,227,809 | 1/1966 | Croft | 179/15 BF |
| 3,686,441 | 8/1972 | Thomas | 179/15 BF |
| 3,691,306 | 9/1972 | Molo | 179/15 BF |
| 3,725,593 | 4/1973 | Palombari | 179/15 BF |

*Primary Examiner*—Ralph D. Blakeslee
*Attorney, Agent, or Firm*—C. S. Phelan

[57] ABSTRACT

A method and apparatus are described for monitoring the performance of a time division multiplexed transmission system. At a test point the time division signal is split. One part of the signal continues to be transmitted without interruption in the system. The other part of the signal is delivered to the apparatus which selectively extracts digital data bits from the time division multiplexed data signal by identifying a group of bits within the data signal after which a sequence of bits, but not all bits, are extracted from the identified group. The remaining bits up through, but not including, the sign bit in a selected digital word are inhibited whereas the sign bit is also extracted. By placing the extracted data bits in positions adjacent in significance to the extracted sign bit, a signal gain is effected upon the digital to analog conversion of the signal. Upon display of the analog signal, transmission characteristics of the system are advantageously obtained by visual analysis.

8 Claims, 3 Drawing Figures

TECHNIQUE AND APPARATUS FOR TESTING A TIME DIVISION MULTIPLEXED TRANSMISSION SYSTEM USING SELECTIVE SIGNAL BIT EXTRACTION

BACKGROUND OF THE INVENTION

1. Field of the Invention

This invention relates to time division multiplexed transmission systems and, in particular, to methods and apparatus for testing such a system by selective data bit extraction.

2. Description of the Prior Art

In time division mutliplexed (TDM) transmission systems, the analog information from an individual source is digitally encoded; and, subsequently, several such digital signals are interleaved in time for transmission over a common digital facility. In general, each of the time interleaved digital signals is comprised of a plurality of binary bits structured in time whereby the significance of the bits ranges from a bit which represents the smallest incremental magnitude of each level of signal quantization up through a bit which represents the polarity of the encoded signal. The bit which represents the incremental magnitude of each level of signal quantization is typically designated the least significant bit, whereas that bit which represents the polarity of the encoded signal is typically referred to as the most significant bit.

The term "word" as used below refers to the entire individual digital signal and encompasses all of the bits therein from the least significant to the most significant.

In many instances, such as the testing of a digital channel bank facility, it would be most advantageous to be able to examine visually the analog representation of either an individual digital signal within the TDM data signal or a number of bits within each word of the signal without interrupting the digital signal being transmitted in the channel bank. Such a visual signal examination is particularly useful for determining analog signal waveform characteristics as the corresponding digital signal traverses the multiple stages of an $N^{th}$ order recursive filter. In order to fully ascertain the waveform characteristics as the digital signal traverses the recursive filter, the signal examination must be effected so as not to break the continuity of signal transmission in the main transmission path of the channel bank.

Furthermore, in the experimental examination of a group of bits within a word, it may be desirable to accommodate the limited dynamic range of a display device by magnifying the relative importance of such a group of bits. Previously, the entire signal word was selected; and upon digital to analog conversion and the subsequent display, the analog signal characteristics represented by the least significant digital bits were masked by the higher analog signal level resulting from the more significant bits. Moreover, the limited dynamic range of the display device emphasized the more significant bits further obscuring the information represented by the least significant bits. As a result ascertaining the analog signal waveform characteristics represented by the less significant bits was difficult to achieve.

Accordingly, one object of the present invention is to test a TDM transmission system without the interruption of signal continuity.

Another object of the present invention is to identify a particular predetermined group of bits in a TDM data signal for signal analysis purposes.

A further object of the present invention is to extract a selected group of digital data bits from the identified group of such bits in a TDM data signal.

Still another object of the present invention is to limit the dynamic range required of visual display devices used to display an analog signal derived from the extracted group of digital data bits.

SUMMARY OF THE INVENTION

The foregoing and other objects of the invention are realized in an illustrative embodiment wherein a time division multiplexed (TDM) channel having a TDM data signal applied thereto is tested by splitting the data signal into two parts. The first part continues to be transmitted without interruption in the TDM channel. The second part is applied to selective bit extraction apparatus wherein the selective bit extraction is effected by first identifying a group of digital data bits in the TDM data signal. After identifying this group of bits, the desired group of signal bits contained therein is selected. All of the remaining bits within the selected TDM word are then inhibited with the exception that the sign bit associated with the selected word is also extracted. The extracted data bits are shifted in significance to a position adjacent to the extracted sign bit. Upon digital to analog conversion of the extracted data bits, a gain is effected as a result of the shift in significance of the data bits. Application of the resultant analog signal to an appropriate display device allows visual analysis of the transmission characteristics of the TDM channel.

Accordingly, it is one feature of the present invention that a TDM channel is available for test purposes while being used in an operating TDM transmission system.

Another feature of the present invention is that a group of bits within a TDM data word can be advantageously examined without having to examine the entire data word.

A further feature of the present invention is that a two's complement TDM signal format can be advantageously accommodated as well as a sign magnitude TDM signal format.

An additional feature of the present invention is that the number of bits in the extracted bit group and the number of bits inhibited within a TDM data word are selectively controllable via manual preselection switches.

BRIEF DESCRIPTION OF THE DRAWINGS

The aforementioned features and objects of the invention, as well as other features and objects, will be better understood upon a consideration of the following detailed description and the appended claims in connection with the attached drawings of an illustrative embodiment in which:

DETAILED DESCRIPTION

Figure 1:
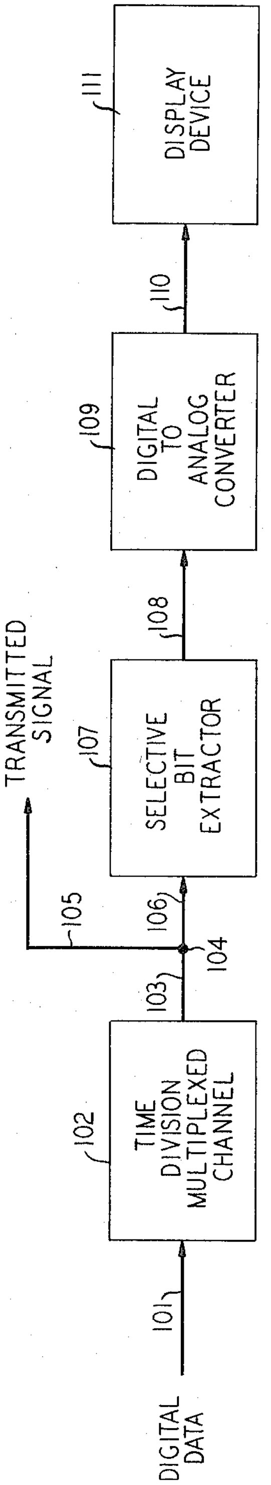
FIG. 1 is a simplified block digram illustrating the noninterruptive test configuration and procedure.

The test configuration illustrated in FIG. 1 shows the noninterruptive feature of the technique for examining the transmission characteristics of a TDM channel 102. A TDM data signal is applied by input circuit 101 to the time division multiplexed channel 102. The output of TDM channel 102 is connected via circuit 103 to circuit node 104. At node 104 the TDM digital data signal is split. One portion continues over a through transmission path provided by circuit 105. The signal on circuit 105 is transmitted to the other TDM system components (not shown) without any break in signal continuity. The remaining portion is delivered by circuit 106 to selective bit extractor 107.

Selective bit extractor 107 identifies and extracts a particular preselected group of bits in the TDM data signal, inhibits certain other bits also preselected, and then selects the sign bit associated with the data word from which the desired data bits were extracted. The extracted data bits are shifted in significance to a position adjacent to the sign bit. This shifting operation is also effected by selective bit extractor 107. The extracted and shifted data bits are coupled by circuit 108 to digital-to-analog converter 109. Upon conversion of the digital data bits to analog form, a gain in signal level occurs as a result of the shift in significance of the extracted data bits. This increase in signal level resulting from the bit shifting operation will become somewhat clearer by means of an illustrative example set out below.

Following conversion of the extracted digital data to analog form, the resultant analog signal is applied via circuit 110 to an appropriate display device 111. With the signal so displayed, numerous transmission characteristics, such as amplitude balance and noise level, can be advantageously ascertained by visual analysis.

Figure 2:
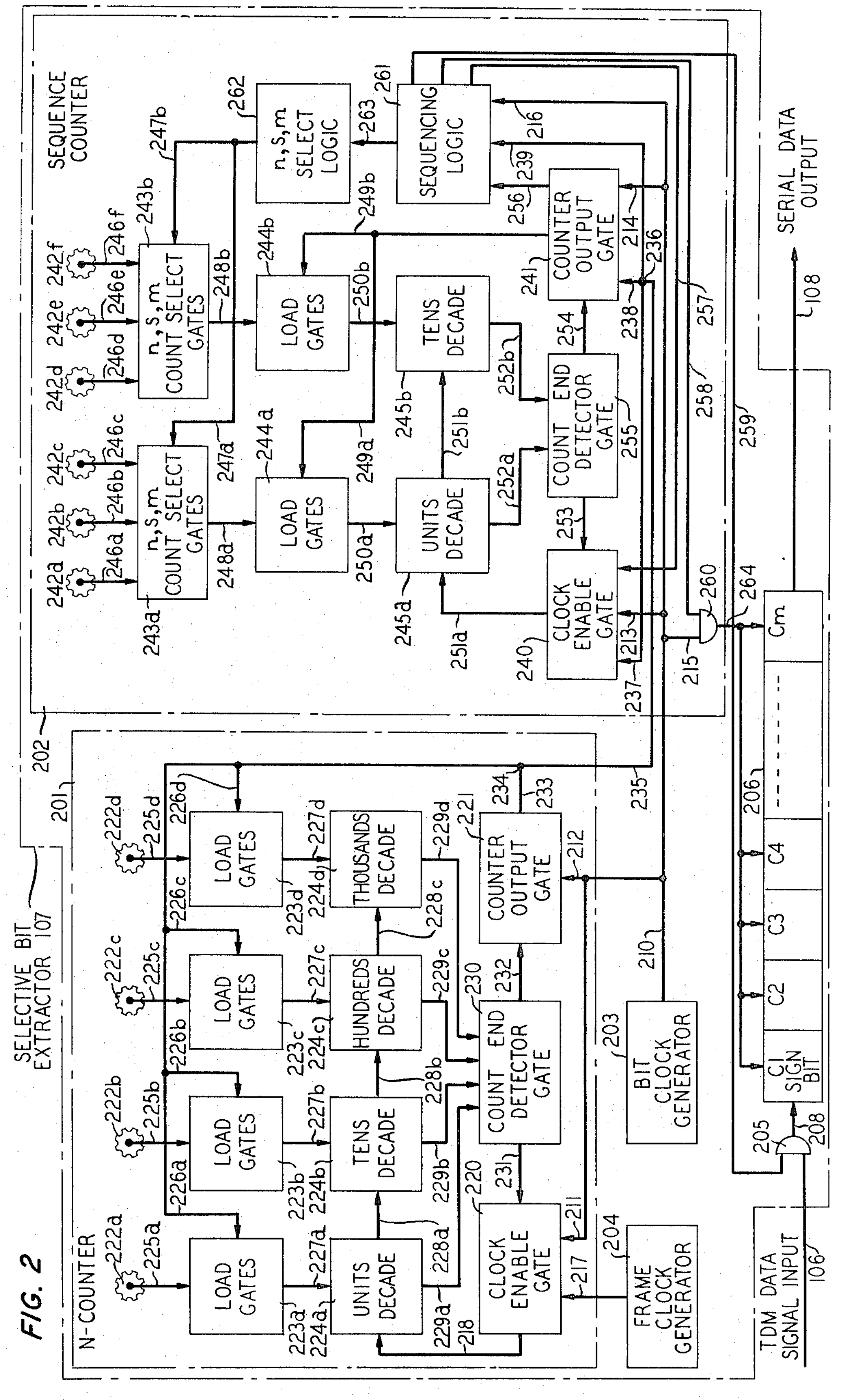
FIG. 2 is a simplified schematic representation of the selective bit extraction circuitry.
Figure 3:
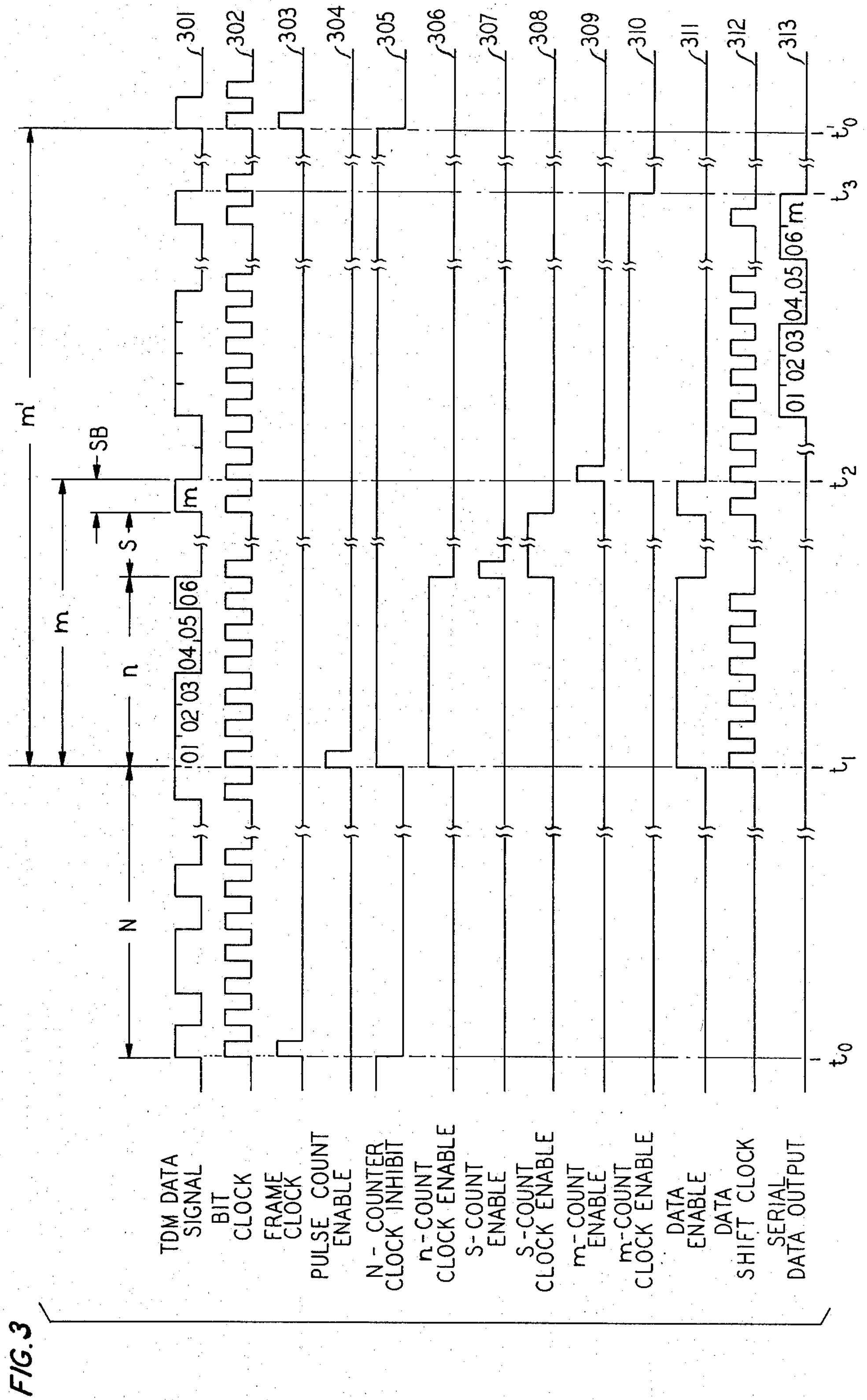
FIG. 3 is a family of timing diagrams which will materially aid in the explanation of the operation of the selective bit extraction circuitry.

Throughout the course of the ensuing discussion, reference will be made quite frequently to the timing and signal waveforms illustrated in FIG. 3. Accordingly, a better understanding of the bit extraction technique will result in FIGS. 2 and 3 are considered simultaneously. In addition, it is to be understood that the TDM data signal shown as waveform 301 in FIG. 3 is an illustrative example only. Waveform 301, as shown, is comprised of three TDM data words. All of the words have *m* bits. The first word encompasses the time interval $t_0$ to $t_1$. The second word encompasses the time interval $t_1$ to $t_2$, and it is this word which will be of interest in the example. The third word in the TDM data signal encompasses the time interval $t_2$ to $t_3$. Between time $t_3$ and time $t'_0$ any number of additional data words may be transmitted, the limit being established by the TDM system operating conditions. At time $t'_0$ the timing cycle repeats although the TDM signal 301 need not necessarily repeat. Consequently, if at time $t_0$ the data came from a particular TDM channel, at time $t'_0$ the data would also come from that same channel. N, as shown in FIG. 3, represents the number of bits from $t_0$ to the first data bit of interest. For the illustrative example N happens to equal *m*.

Having established the general format of the TDM data signal, it will somewhat simplify the ensuing discussion if a particular example is utilized to describe the selective bit extraction. Accordingly, again focusing on waveform 301, and in particular on the second word therein, it should be noted that the six least significant bits within the word are of interest. These bits are appropriately labelled 01 through 06 so as to avoid any confusion with the figure numbers. For this example then, *n*, the number of data bits to be extracted, will be equal to six. Those data bits within the m-bit word which are to be inhibited are denoted by *s*. The most significant bit, the sign bit, denoted by SB, is to be extracted along with the six data bits. This bit also represents the $m^{th}$ bit in the *m*-bit data word. Finally, the parameter $m'$ represents the number of data bits occurring from the start of the group of *n* data bits to be extracted up through the repeat of the timing sequence initiated by a frame clock signal 303.

In summary then, for the example chosen, the first data word will be inhibited, the six least significant bits of the second data word are to be extracted, the remaining data bits within the second word are to be inhibited, and then the sign bit of that word is to be extracted. All of the remaining data words within the TDM data signal 301 are to be inhibited until the second word following the frame clock signal 303 is again encountered.

Selective bit extractor 107 is shown in more detail in FIG. 2. As data signals are applied on circuit 106, bit rate clock pulses from a bit clock generator 203 are counted by preset decade counting circuits in counters 201 and 202 to develop control signals for operating data gate 205. The first step in the selective bit extraction process is the identification of the group of $m'$ TDM data bits wherein occurs the desired *n* data bits and the sign bit of the m-bit data word. This step is implemented in the manner described hereinbelow.

Bit clock generator 203 supplies the basic timing signals, shown as waveform 302 in FIG. 3, for operation of the selective bit extractor 107. Waveform 302, as illustrated, is a continuous series of pulses with a recurrence period equal to the time interval allocated for each bit of TDM data. The bit clock signals 302 are distributed from bit clock generator 203 via feeder circuit 210. A clock enable gate 220 of N-counter 201 receives bit clock signals 302 via circuit 211 while counter output gate 221 is fed by circuit 212. Clock enable gate 240, counter output gate 241, bit clock gate 260, and sequencing logic 261 of sequence counter 202 receive bit clock signals 302 via circuits 213, 214, 215, and 216, respectively.

Frame clock signal 303 supplied by frame clock generator 204 is in time coincidence with the first bit clock pulse beginning at time $t_0$. The recurrence period of the frame clock signal 303 is substantially greater than that of bit clock signal 302, since the frame clock signal 303 repeats only after all of the channels multiplexed in the TDM system have been sampled. Upon application of the frame clock signal 303 to clock enable gate 220 through circuit 217, N-counter 201 is enabled to count the N bit clock pulses until the desired data bits are encountered.

Clock enable gate 220 is a flip-flop controlled gate which opens upon receiving the frame clock signal 303 and is closed when the count end detector gate 230 senses an all zero condition out of decade counters 224*a* through 224*d*. During the interval that clock enable gate 220 is open, N bit clock pulses are delivered to the decade counters 224*a* through 224*d* via circuit 218. Overflows from the units decade 224*a* to the tens decade 224*b*, the tens decade 224*b* to the hundreds decade 224*c*, and the hundreds decade 224*c* to the thousands decade 224*d* are transmitted over circuits 228*a*, 228*b* and 228*c*, respectively.

The decade counter stages 224*a* through 224*d* of N-counter 201, as well as stages 245*a* and 245*b* of sequence counter 202, are of the same general type as those described in Motorola application note AN-456, which is published in *The Microelectronics Data Book*, copyright 1969 by Motorola Semiconductor Products Inc., with the slight modification that counter operation is initiated with a controlled reset rather than a continuous automatic reset following the completion of the count.

The limits for the decade counters 224*a* through 224*d* are manually preselected, prior to the initiation of the bit extraction process, by means of thumbwheel switches 222*a* through 222*d*. At the same time that the N-count limit is being manually set, so too are the limits for the sequence counter 202. These limits are referred to as an *n*-count, an *s*-count and an *m*-count and will be discussed in more detail in the course of the description of the sequence counter 202.

Thumbwheel switches 222*a* through 222*d*, as well as thumbwheel switches 242*a* through 242*f*, are of the same general type as those manufactured by Electronic Engineering Co. and designated No. 177612GV. These switches complete an electrical circuit between a voltage source (not shown) and ground, and, in addition, convert the decimal number selected to a binary coded decimal (BCD) format. Since all integers between zero and nine are to be accommodated, four leads (not shown) must connect each thumbwheel switch 222*a* through 222*d* to its corresponding load gate 223*a* through 223*d*. The four leads are schematically represented as single circuits 225*a* through 225*d*. It should be noted at this point that the load gates 223*a* through 223*d* are each illustrated schematically as a single unit whereas in reality each load gate 223*a* through 223*d* represents a level of NOR gates with one gate for each BCD signal. The thumbwheel switches 222*a* through 222*d* are set in accordance with the number of TDM data bits, N, that will occur between the frame clock signal 303 and the *n* data bits to be extracted. The limits as set are loaded into the decade counters 224*a* through 224*d* via circuits 227*a* through 227*d* upon the load gates 223*a* through 223*d* receiving a pulse count enable signal 304 from the counter output gate 221 over circuits 223 and 226*a* through 226*d*. In actuality the limits of the N-count are loaded into the decade counters 224*a* through 224*d* during the present timing cycle in preparation for the next timing cycle with the implementation of the N-count effected upon a frame clock signal 303 opening clock enable gate 220. Cycle as used herein corresponds to the recurrence period of the frame clock signal 303.

When the number of bit clock pulses counted by decade counters 224*a* through 224*d* reaches the limits set by thumbwheel switches 222*a* through 222*d*, an all zero end count indication is detected by count end detector gate 230. Count end detector gate 230, although shown as a single block, is in reality a level of interconnected OR gates. Connection from decade counters 224*a* through 224*d* to count end detector gate 230 is made via circuits 229*a* through 229*d*. Upon detecting the all zero condition, count end detector gate 230 generates an N-counter clock inhibit signal 305 which is transmitted to clock enable gate 220 via circuit 231 thereby closing the gate and preventing further bit clock pulses from entering decade counters 224a through 224d. In addition, count end detector gate 230 transmits a count end signal, which is the complement of N-counter clock inhibit signal 305 to counter output gate 221 via circuit 232. Counter output gate 221 generates a pulse count enable signal 304 which is delivered via circuit 233 to circuit node 234. Counter output gate 221 is readily implemented with a flip-flop circuit of the J-K type with the complementary outputs driving an OR and a NOR gate to increase fanout capability.

The pulse count enable signal 304 is used for two purposes. The first purpose is to load the N-count limits selected by thumbwheel switches 222*a* through 222*d* through the load gates 223*a* through 223*d* into the decade counters 224*a* through 224*d*. As indicated previously this loading occurs at the conclusion of the current count in anticipation of the succeeding count. The second purpose is to enable the sequence counter 202.

In summary, up to this point, the number of TDM data bits, N, occurring between a frame clock pulse and those data bits to be extracted have been manually programmed into the N-counter 201 via thumbwheel switches 222*a* through 222*d* and the count has been effected. At the conclusion of the count, further bit clock pulses are prevented from entering the decade counters 224*a* through 224*d* by closing the clock enable gate 220. Also, a pulse count enable signal 304 is generated which loads the count limits selected by the thumbwheel switches 222*a* through 222*d* into the decade counters 224*a* through 224*d* for the subsequent operating cycle. This pulse count enable signal 304 is further used to enable sequence counter 202. The overall effect of this set of operations is the identification of the starting point in time at which the bit train of interest begins. This results from inhibiting N data bits applied to data gate 205 via circuit 106 thereby preventing these N data bits from entering shift register 206.

With the starting time of the *m'* data bits identified, the next step is to extract the *n* data bits of interest, then to inhibit those bits within the *m*-bit data word which are of no interest, followed by selection of the most significant bit, the sign bit. These steps are implemented by having sequencing logic 261, which is responsive to clock pulses from bit clock generator 203, initiate three successive preselected counts for controlling the entry of data into a shift register 206. The three separate count limits are an *n*-count, an *s*-count and an *m*-count. More will be said about each of these count limits in due course, but for now attention should be focused on the *n*-count limit. This limit corresponds to the number of TDM data bits which are to be extracted from the TDM data signal 301, and, for the example used herein is six. As indicated previously, these limits are selected and set prior to the initiation of the bit extraction process.

The pulse count enable signal 304 generated by N-counter 201 is coupled through circuit node 234 via circuit 235 to circuit node 236. Pulse count enable signal 304 is further routed from circuit node 236 to clock enable gate 240 via circuit 237, to counter output gate 241 via circuit 238, and to sequencing logic 261 via circuit 239.

Upon receipt of the pulse count enable signal 304, sequencing logic 261, comprised of an interconnected set of J-K type flip-flops, initiates its first control sequence. Three such control sequences are implemented during a frame cycle, frame cycle being defined previously. Sequencing logic 261 supplies an *n*-count clock enable signal 306 to clock enable gate 240 via circuit 257. With the *n*-count clock enable signal 306 and the pulse count enable signal 304 applied to the clock enable gate 240, the gate is opened and remains open until a count end detector gate 255 senses an all zero condition indicating completion of the *n*-count. During the time the clock enable gate 240 is open, bit clock pulses are applied via circuit 251*a* to units decade counter 245*a*. Overflows from units decade counter 245*a* to tens decade counter 245*b* are coupled through circuit 251*b*. When the all zero condition occurs the clock enable gate 240 is closed thereby preventing further clock pulses from reaching the decade counters 245*a* and 245*b*. The implementation of the clock enable gate 240 is similar to that of clock enable gate 220, that is, it is a flip-flop controlled gate.

The *n*-count limits, as well as the *s*-count and *m*-count limits, are supplied to the decade counters 245*a* and 245*b* in a manner quite similar to that used to load the N-count limit into decade counters 224*a* through 224*d* of N-counter 201. Because three separate count limits are involved, count select gates 243*a* and 243*b* are interposed after thumbwheel switches 242*a* through 242*f* to route the correct preselected count limit to the decade counters 245*a* and 245*b*. The count select gates 243*a* and 243*b* are realized with a level of AND gates which are controlled by select logic 262 which in turn is responsive to signals from sequence logic 261. As was the case for the N-count limit, the *n*, *s* and *m* count limits are loaded into the decade counters 245*a* and 245*b* at the end of the previous control sequence in anticipation of the next control sequence.

With the *n*-count limits having been previously selected by thumbwheel switches 242*a* and 242*d*, the BCD representation of the *n*-count limits are routed through circuits 246*a* and 246*d* to count select gates 243*a* and 243*b*. In a similar fashion the BCD representation of the *s*-count and the *m*-count limits previously selected by thumbwheel switches 242*b* and 242*e* for the *s*-count and thumbwheel switches 242*c* and 242*f* for the *m*-count, are routed through circuits 246*b*, 246*e* and 246*c*, 246*f*, respectively, to count select gates 243*a* and 243*b*. As was the case with circuits 225*a* through 225*d* in N-counter 201, circuits 246a through 246*f* are physically realized by four separate input leads but are schematically represented as a single circuit.

The count limits are transferred to load gates 244*a* and 224*b* via circuits 248*a* and 248*b*. From the load gates 244*a* and 244*b*, the count limits are loaded into the decade counters 245*a* and 245*b* via circuits 250*a* and 250*b*. The loading takes place when the counter output gate 241 receives an indication of an all zero count condition from count end detector gate 255. The load command is transmitted to the load gates 244*a* and 244*b* over circuits 249*a* and 249*b*.

With the *n*-count limits in the decade counters 245*a* and 245*b*, the *n*-count commences. After *n* bit clock pulses have been counted, six for the example, the count is terminated. The count termination is effected when the number of bit clock pulses counted by the decade counters 245*a* and 245*b* equals the *n*-count limits set by thumbwheel switches 242*a* and 242*d*. This corresponds to an all zero count condition. Count end detector gate 255, which is similar in construction to count end detector gate 230 in N-counter 201, senses this condition via circuits 252*a* and 252*b* and delivers a set pulse to the clock enable gate 240 over circuit 253. Further bit clock pulses are thereby prevented from entering decade counters 245*a* and 245*b*.

At the same time that count end detector gate 255 is causing clock enable gate 240 to be closed, count end detector gate 255 also delivers the complement of the set pulse, an *s*-count enable signal 307, to counter output gate 241 via circuit 254. Counter output gate 241 in turn transmits this signal to sequencing logic 261 over circuit 256. As indicated previously the load gate enabling signals occur at the end of the previous control sequence in preparation for the next control sequence. Hence, the next operation is the implementation of the *s*-count. However, the discussion of this step will be deferred momentarily until the *n*-count operation has been fully described.

During the time the clock enable gate 240 was open and bit clock pulses were being counted in accordance with the *n*-count, the sequencing logic 261 supplied an enable pulse to the bit clock gate 260 via circuit 258. In addition, a data enable pulse 311 is supplied from sequencing logic 261 to data gate 205 via circuit 259. With data gate 205 enabled, the *n*-bits, or, for the example used herein, bits 01 through 06, of the TDM data signal 301 are entered into the shift register 206 over circuit 208. This entry is made a bit at a time. For example, bit 01 is passed by data gate 205 into cell C1 of shift register 206. Whatever signal information which had previously resided in cell C1 is shifted to cell C2 upon a data shift clock signal 312 being received by shift register 206 from bit clock gate 260 over circuit 264. When bit 02 is encountered, it passes through data gate 205 and enters cell C1. However, bit 01 which had been in cell C1 is now in cell C2 as a result of shift register 206 receiving another data shift clock signal 312 from bit clock gate 260. In like manner the remaining four desired TDM data bits 03 through 06 are entered into shift register 206. In a more general case the *n* desired data bits would be entered into the shift register 206 in the same bit-by-bit manner.

When all of the desired data bits are extracted from the TDM data signal 301, the data gate 205 is closed or disabled preventing further data pulses from entering shift register 206. This disabling operation is time coincident with the termination of the *n*-count by decade counters 245*a* and 245*b* and is shown in *n*-count clock enable waveform 306.

To summarize briefly, what the above operations have achieved is the extraction of *n* data bits from the TDM data signal 301, with the extracted bits being stored in cells C1 through C6 of shift register 206. In addition, sequence counter 202 has been initialized for commencement of the *s*-count operation.

Having completed the extraction of the *n* data bits the sequencing logic 261 commences its second control sequence whereby, the *s* data bits between the end of the desired bit group and the sign bit are inhibited from entering the shift register 206. When the all zero condition following the *n*-count was sensed by the count end detector gate 255, an *s*-count enable signal 307 was delivered to counter output gate 241. Counter output gate 241 is very similar to counter output 221 in that it too is physically realized as a flip-flop controlled gate. A first output from counter output gate 241 initiates the sequencing logic 261 for the commencement of the second control sequence. The sequencing logic 261 delivers a reset pulse to select logic 262 over circuit 263 whereby the two stage binary counter of the select logic 262 begins its count. Since three count select parameters are utilized, a two stage counter is adequate with three of the counts being associated with the three count select parameters and the fourth count not being used. When the appropriate count is reached in the select logic 262, the corresponging gates in count select gates 243*a*and 243*b* are enabled by a control pulse supplied thereto over circuits 247*a* and 247*b*.

With the count select circuits 243*a* and 243*b* activated to accept the *s*-count limits and with the load gates 244*a* and 244*b* being opened by the load signal from counter output gate 241, the *s*-count limits are read into decade counters 245*a* and 245*b*. At the same time that the *s*-count limits are being loaded into the decade counters 245*a* and 245*b*, the sequencing logic 261 provides an *s*-count clock enable signal 308 to clock enable gate 240 via circuit 257. The *s*-count clock enable signal 308 opens the clock enable gate 240 so that bit clock pulses enter the decade counters 245*a* and 245*b*.

At the end of the *s*-count an all zero condition is detected by count end detector gate 255 and, accordingly, clock enable gate 240 is closed, thereby preventing further bit clock pulses from entering decade counters 245*a* and 245*b*. Count end detector gate 255 also transmits an *m*-count enable signal 309 to counter output gate 241. This *m*-count enable signal 309 readies counter output gate 241 for the generation of a load signal to read in the *m*-count limits preselected by thumbwheel switches 242*c* and 242*f*. While the *s*-count was being implemented sequencing logic 261 maintained data gate 205 in a disabled condition thereby preventing additional data pulses from entering shift register 206.

Up to this point *m'* data bits have been identified in a TDM data signal 301. A group of *n* bits has been selected from the group of *m'* bits. In addition, a group of *s* bits which are contiguous in time with the *n* bits, have been inhibited.

To select the sign bit, the end *s*-count condition is routed from counter output gate 241 to sequencing logic 261. Sequencing logic 261 delivers a gate control signal to bit clock gate 260 and a data enable pulse 311 to date gate 205. At this point the sign bit enters shift register 206. The six data bits 01 through 06 stored therein are shifted one bit position as a result of a data shift clock pulse 312 being delivered to shift register 206 from bit clock gate 260. Since the data bits were not shifted during the *s*-count, upon the sign bit being extracted from the TDM data signal 301, the data bits now occupy a position of significance adjacent to the sign bit.

The remaining steps of the bit extraction technique involve the removal of the extracted data bits and sign bit from the shift register 206. The data removal is the function of the *m*-count whereby sequencing logic 261 controls bit clock gate 260 to shift the extracted data out of shift register 206.

At the conclusion of the *s*-count the all zero end count indication was transmitted to counter output gate 241 which in turn delivered a load pulse to the load gates 244*a* and 244*b*. In addition, counter output gate 241 transmitted the *m*-count enable signal 309 to sequencing logic 261 whereby the third control sequence is initiated. Sequencing logic 261 sets the two stage counter in select logic 262. On reaching the proper count, the count select gates 243*a* and 243b are opened and the *m*-count limits are read into decade counters 245*a* and 245*b*. The *m*-count operation is implemented in the same manner as the *n* and *s* counts. Sequencing logic 261 delivers an *m*-count clock enable signal 310 to clock enable gate 240 and bit clock pulses are routed to the decade counters 245*a* and 245*b*. At the same time that the m-count is being implemented, sequencing logic 261 controls the bit clock gate 260 whereby the data shift clock signal 312 is applied to shift register 206. During the time interval $t_2$ to $t_3$ shown in FIG. 3, *m* data shift clock pulses are generated. With the application of the data shift clock signal 312 to shift register 206, the six data bits and the sign bit stored therein are read out in serial format on circuit 108. The output data is illustrated by waveform 313. During the shifting of the six data bits and the sign bit out of shift register 206, the data gate 205 is disabled, thereby preventing further data bits from entering shift register 206. The composite operation of the data gate 205 is best shown by data enable waveform 311.

The shifting of the data out of shift register 206 occurs simultaneously with the *m*-count operation. When end count is reached, count end detector gate 255 senses the all zero condition and clock enable gate 240 is again closed thereby preventing further bit clock pulses from reaching the decade counters 245*a* and 245*b*. Count end detector gate 255 also provides a complementary end count indication to counter output gate 241 for loading the *n*-count limits. Moreover, counter output gate 241 forwards the end count indication to sequencing logic 261 which in turn sets select logic 262 whereby the *n*-count limits set by thumbwheel switches 242*a* and 242*d* are read into count select circuits 243*a* and 243*b* for the next cycle of operation.

To summarize, a group of *m'* data bits have been identified in a TDM data signal 301 by inhibiting N data bits following a frame clock timing pulse. A group of *n* desired data bits are then selected from the *m'* group, a group of *s* data bits are inhibited within an *m* bit word and the sign bit associated with the *m* bit word is extracted. The extraction has occurred in such a fashion that the extracted sign bit remains in its position of significance within the digital word but the extracted data bits 01 through 06 are in effect shifted in significance to a position adjacent to the sign bit. This is shown in the serial data output waveform 313. Upon the subsequent digital-to-analog conversion of the extracted data, a signal gain results.

This gain effect is most easily understood if one considers that bit 01 initially had a digital weight of $2^0$. Bit 02 had a digital weight of $2^1$. Bits 03 through 06 had digital weights of $2^2$ through $2^5$, respectively. The sign bit occurs in a position corresponding to a digital weight of $2^{(m-1)}$. After the extraction process, the sign bit remains in the position having a relative weight of $2^{(m-1)}$, but bit 06 now has a weight of $2^{(m-2)}$ or $2^{(s+5)}$. Similarly, bits 05 through 01 have weights of $2^{(s+4)}$ through $2^s$, respectively. Hence, the gain effected is $2^s$.

While the foregoing discussion has centered on a sign-magnitude TDM signal format, it is to be recognized that a two's complement signal format is accommodated equally as well.

Although the present invention has been described in connection with a particular embodiment thereof, further embodiments and modifications which will be apparent to those skilled in the art are included within the scope and spirit of the invention.

What is claimed is:

1. Apparatus for testing a time division multiplexed transmission system comprising a time division multiplexed transmission channel having a digital data signal transmitted thereon, said signal including recurrent intervals of bits in time sequence positions of different binary significance means for splitting said digital data signal into first and second parts with said first part remaining in said transmission channel without interruption of signal continuity, means for selectively extracting a group of digital data bits from said second signal part, means for converting said extracted digital data bits into an analog signal form with the same analog signal level range being employed regardless of the digital significance range, and means for displaying said analog signal whereby the transmission characteristics of said time division multiplexed transmission system are advantageously obtained by visual analysis.

2. The apparatus in accordance with claim 1 wherein the means for selective bit extraction comprises means for identifying a group of $m'$ digital data bits in said time division multiplexed data signal, means for selecting a group of $n$ digital data bits from said group of $m'$ data bits, with $n$ being less than $m'$, means for inhibiting a group of $[(m-1)-n]$data bits, with $m$ representing the number of data bits in a digital word of said time division multiplexed data signal, $m$ being greater than $n$ but less than $m'$, means for selecting a sign bit from said m-bit digital data word, and means for shifting said group of $n$ data bits to positions adjacent in significance to said sign bit.

3. The apparatus in accordance with claim 2 wherein said extracting means includes means for periodically generating bit clock pulses, and said identifying means includes means for periodically generating frame clock pulses which are in time coincidence with an initial one of a first predetermined number of said bit clock pulses, said frame clock pulses having a recurrence period much greater than the recurrence period of said bit clock pulses, means for counting a second predetermined number of bit clock pulses provided by said bit clock pulse generating means following the occurrence of said frame clock pulse provided by said frame clock pulse generating means, and a gated data register having said time division multiplexed data signal applied thereto, said gated register controlled by said counting means whereby said time division multiplexed data signal is inhibited from entering said gated register during the occurrence of said second predetermined number of bit clock pulses.

4. The apparatus in accordance with claim 3 wherein the means for counting comprises a synchronous decade counter having load gates at the input to each stage, a plurality of thumbwheel switches for manually programming the limits of the count, means for activating said counter load gates, whereby said count limits are applied to said decade counter from said thumbwheel switches, means for detecting count end when the number of bit clock pulses counted equals the count limits set by said thumbwheel switches, and means for inhibiting bit clock pulses from entering said counter when said count end is detected.

5. Apparatus for extracting a group of $n$ digital data bits and a sign bit from an $m$-bit data word in a time division multiplexed digital data signal with $m$ greater than $n$ said apparatus comprising means for periodically generating a bit clock signal, means for periodically generating a frame clock signal, first counting means for generating a pulse count enable signal in response to said frame clock signal and said bit clock signal after a first predetermined number of bit clock signals have occurred following said frame clock signal, second counting means for generating data enable gating signals and data shift clock signals in response to said bit clock signals and said pulse count enable signal when a second predetermined number of bit clock signals have occurred following said pulse count enable signal with said second counting means further generating an additional data enable gating signal and a data shift clock signal after a third predetermined number of bit clock signals following said pulse count enable signal, a shift register, means controlled by all of said data enable gating signals for gating said $n$ bits and said sign bit of said time division multiplexed data signal into said shift register, and means controlled by said data shift clock signals for shifting said group of $n$ data bits to positions adjacent in significance to said sign bit.

6. A technique for testing a time division multiplexed digital data transmission system comprising the steps of transmitting a digital data signal over a time division multiplexed data channel, said data signal including recurrent intervals of bits in time sequence positions of different binary significance, splitting said digital data signal into first and second parts with said first part remaining in said data channel without interruption of signal continuity, extracting a selected group of digital data bits from said second signal part, converting said extracted digital data bits into an analog signal form, with the same analog signal level range being employed regardless of the digital significance range, displaying said analog signal whereby the transmission characteristics of said time division multiplexed transmission system are advantageously obtained by visual analysis.

7. The technique in accordance with claim 6 wherein the extracting step further comprises the steps of identifying a group of $m'$ digital data bits in said time division multiplexed data signal, selecting a group of $n$ digital data bits from said group of $m'$ data bits, $n$ having a value less than $m'$, inhibiting a group of $[(m-1)-n]$data bits, with $m$ representing the number of data bits in a digital word of said time division multiplexed data signal, $m$ having a value greater than $n$ but less than $m'$, selecting a sign bit from said $m$-bit digital data word, and shifting said group of $n$ data bits to positions adjacent in significance to said sign bit.

8. A technique for testing a time division multiplexed digital data transmission system comprising the steps of transmitting a digital data signal over a time division multiplexed data channel, said data signal including recurrent intervals of bits in time sequence positions of different binary significance, splitting said digital data signal into first and second parts with said first part remaining in said data channel without interruption of signal continuity, extracting a group of $n$ digital data bits out of a group of $m$ such bits in said second signal part with $m$ being greater than $n$, extracting a sign bit out of said group of $m$ digital data bits, shifting said group of $n$ data bits to positions adjacent in significance to said sign bit, converting said extracted digital data bits into an analog signal format with the same analog signal level range being employed regardless of the digital significance range, and displaying said analog signal whereby the transmission characteristics of said time division multiplexed transmission system are advantageously obtained by visual analysis.

* * * * *